3,420,126
THREAD CUTTING MACHINE
Pierre Edouard Renoux, Colombes, France, assignor to Societe Anonyme dite: Cri-Dan, Paris, France, a corporation of France
Filed Aug. 15, 1966, Ser. No. 572,560
Claims priority, application France, Sept. 3, 1965, 30,440
U.S. Cl. 82—5                                        9 Claims
Int. Cl. B23g 1/00; B23g 11/00

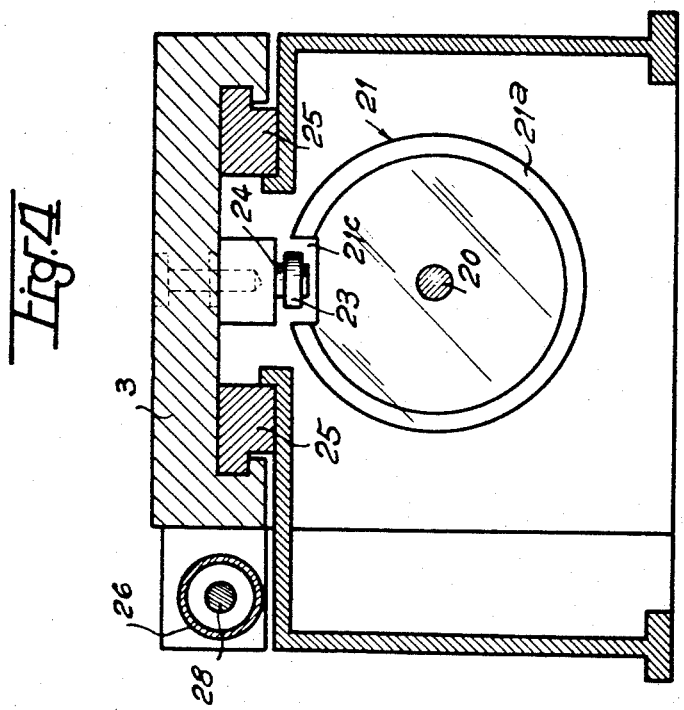
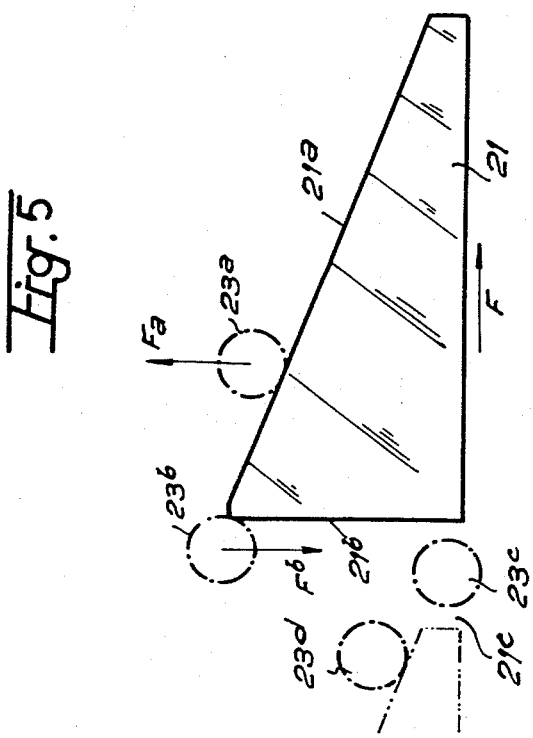

This invention is directed to an improved thread-cutting machine of the type comprising at least one headstock with rotary spindle and chuck for clamping the part to be machined, a bed or frame, a slide-rest which is adapted to move lengthwise along the bed by means of a roller working in conjunction with a longitudinal-motion rotary cam in opposition to a pressure means, a cross-slide which is adapted to move transversely on the slide-rest under the action of a transverse-motion control unit, a tool-holder mounted on the cross-slide and means for driving the rotary spindle, the longitudinal-motion rotary cam and the transverse-motion control unit.

Among the thread-cutting machines of the type referred to, the invention is more specifically although not exclusively concerned with a semi-automatic cam-operated thread-cutting lathe wherein the motion of the slide-rest which determines the screw pitch is produced by a helical longitudinal-motion cam which is driven in rotation by the main spindle in opposition to a pressure means constituted by a hydraulic jack whilst the intermittent reciprocating transverse motion of the cross-slide is produced by a transverse-motion control unit from one or a number of transverse-motion cams coupled to the longitudinal-motion cam.

Among the semi-automatic thread-cutting lathes of the type hereinabove referred to, the invention is also more specifically directed to a lathe for cutting internal threads in coupling sleeves which are provided with two screw-threads designed to cooperate with the end screw-threads of connecting tubes, said thread-cutting lathe being provided on each side of its headstock with two identical symmetrical systems each comprising a bed, a slide-rest, a cross-slide and a tool-holder, each of said systems being intended to form one of the two screw-threads of the coupling sleeve.

It is known that thread-cutting machines and in particular thread-cutting lathes of the type thus defined have one important limitation in that it frequently proves necessary to carry out a displacement of the slide-rest or so-called "disengagement" so as to move away from the headstock the slide-rest and consequently the cross-slide and the tool-holder which is mounted on this latter, with a view to permitting both the loading and removal of the work-piece prior to and after machining or alternatively to permitting inspection prior to removal, as is usually the case with internally-threaded parts such as coupling sleeves.

It will be noted in addition that, although it is possible in some machines to load or remove the work-piece at the rear end of the headstock, thereby dispensing with the need of "disengaging" the tool-slides, an arrangement of this kind is not feasible in the case of a symmetrical threading lathe for cutting internal threads in coupling sleeves inasmuch as a lathe of this type is provided with tool-slides on each side of the headstock.

An attempt has been made to overcome these limitations by having recourse to an intermediate system or so-called saddle which permitted disengagement of the slide-rest over a long range of travel. Said saddle was mounted between the bed and the slide-rest so as to move lengthwise along the bed and thus permit the movement of disengagement over a long range of travel. The slide-rest was in turn mounted so as to slide lengthwise on the saddle so as to perform the movement of lesser amplitude required for forming the thread.

The result thereby achieved was the super-position of two longitudinally-sliding units, namely the saddle and the slide-rest. While this design did in fact solve the problem of disengagement of the slide-rest, it presented inherent disadvantages both from technical and economic standpoints. The net result was a substantial overall height of the assembly, the addition of play which contributed to reduce the strength, rigidity and precision of the machine, and a higher cost price.

The object of the present invention is to permit the possibility of longitudinal disengagement in machines of the type referred to without thereby entailing the drawbacks which are attached to the presence of a saddle.

With this object in mind, a machine in accordance with the invention is essentially characterized in that the longitudinal-motion cam or at least one of its longitudinal-motion cams is provided with a recess which permits the entry of the roller with which said cam cooperates, means being provided for preventing said entry during thread-cutting operations.

It is apparent that a machine of improved design as thus contemplated operates in the same manner as a conventional machine while thread-cutting is in progress and that the roller cooperates with the longitudinal-motion cam in the usual manner inasmuch as it cannot pass through the recess which is provided. On the other hand, and in view of the fact that, in accordance with the invention, the roller is permitted to pass through the recess between thread-cutting operations, it is possible to "disengage" the slide-rest for the purpose of effecting the loading removal or inspection of workpieces.

Preferably, the recess referred to is placed between the extremity of the rapid-return section and the beginning of the slow-feed section of the longitudinal-motion cam; this position corresponds in fact to the position occupied by the components of the machine when this latter stops on completion of a thread-cutting operation.

So far as concerns the means for preventing the roller from passing through the recess during the work periods, it will be readily apparent that such means could consist of a retractable shutter or any equivalent obstacle which may be withdrawn. However, in one particularly advantageous embodiment of the invention, the expedient employed for preventing the roller from passing through the recess consists in locking the pressure means when the roller is located opposite to the recess.

It will be apparent that this arrangement is highly advantageous inasmuch as it dispenses with the need of any additional mechanical component.

In particular, the arrangement proposed can be carried into effect in a particularly simple manner when the pressure means is constituted by a fluid-type jack since it is merely necessary in that case either to isolate the jack in order to render it inoperative or to provide the jack with such dimensions that this latter is located at the end of travel when the roller is located in the lowermost portion of the upwardly sloping ramp of the cam.

In accordance with yet another improvement which comes within the scope of the invention, the machine is equipped with a means for the disengagement and return of the slide-rest which can be put into operation after completion of a thread-cutting operation.

It will in fact be understood that, while it is possible in theory to displace the slide-rest by hand when the roller is located opposite to the recess, it proves necessary in actual practice, especially in the case of semi-automatic thread-cutting lathes, to provide a special means for effecting the disengagement when a thread-cutting operation has been completed, then for returning the slide-rest for the execution of a further operation.

In this case also, a large number of means for effecting the disengagement operation could be employed within the scope of the invention such as, for example, a toothed rack which is rigidly fixed to the slide-rest so as to co-operate with a toothed roller which is driven by an electric motor controlled either by means of a manual push-button or by means of an automatic control system.

However, for the purpose of effecting the longitudinal disengagement of the slide-rest, preference is given to the use of a double-acting fluid-type jack which is coupled on the one hand to the bed and on the other hand to the slide-rest, said jack being supplied with fluid at the requisite moment so as to initiate either the disengagement or the return motion of the slide-rest.

As an advantageous feature, when the pressure means is a jack, the disengagement jack and the pressure jack are mounted in alignment, the former being mounted on the bed and the latter on the slide-rest, said jacks being disposed opposite to each other with a common piston rod.

It is apparent that, when the disengagement jack is locked, the piston rod just referred to consitutes for the pressure jack the fixed point which is secured to the bench and which makes it possible to apply the roller of the slide-rest against the longitudinal-motion cam.

On the contrary, when the pressure jack is locked, that is to say precisely when the roller is located opposite to the recess, and if a thread-cutting operation terminates at that moment, the disengagement jack can be supplied with fluid and the disengagement of the slide-rest can thus be effected inasmuch as the piston rod which is common to both jacks is then keyed with respect to the pressure jack and therefore with respect to the slide-rest.

In accordance with yet a further improvement which can be included in the scope of this invention, both the pressure jack and the disengagement jack can be combined into a single jack since their two pistons which are interconnected by the common rod are rigidly coupled to each other.

There is thus made available to users a thread-cutting machine which is capable of producing the disengagement of the slide-rest automatically, without any increase in overall height or in play, this result being achieved in a particularly economical manner since no provision need be made for any additional component.

Those who are well versed in the art will therefore readily visualize that the invention provides a substantial improvement for users of thread-cutting machines and especially for users of semi-autiomtic thread-cutting lathes, above all symmetrical lathes for the internal thread-cutting of coupling sleeves.

A clear understanding of the invention will in any case be gained from the description which follows below, reference being had to the accompanying drawings in which one embodiment of the invention is given by way of example without any limitation being implied, and in which:

FIG. 4 is a transverse cross-section of the same machine taken in the plane of the roller which cooperates with the longitudinal-motion cam, and FIG. 5 shows the development of the longitudinal-motion cam.

Figure 1:
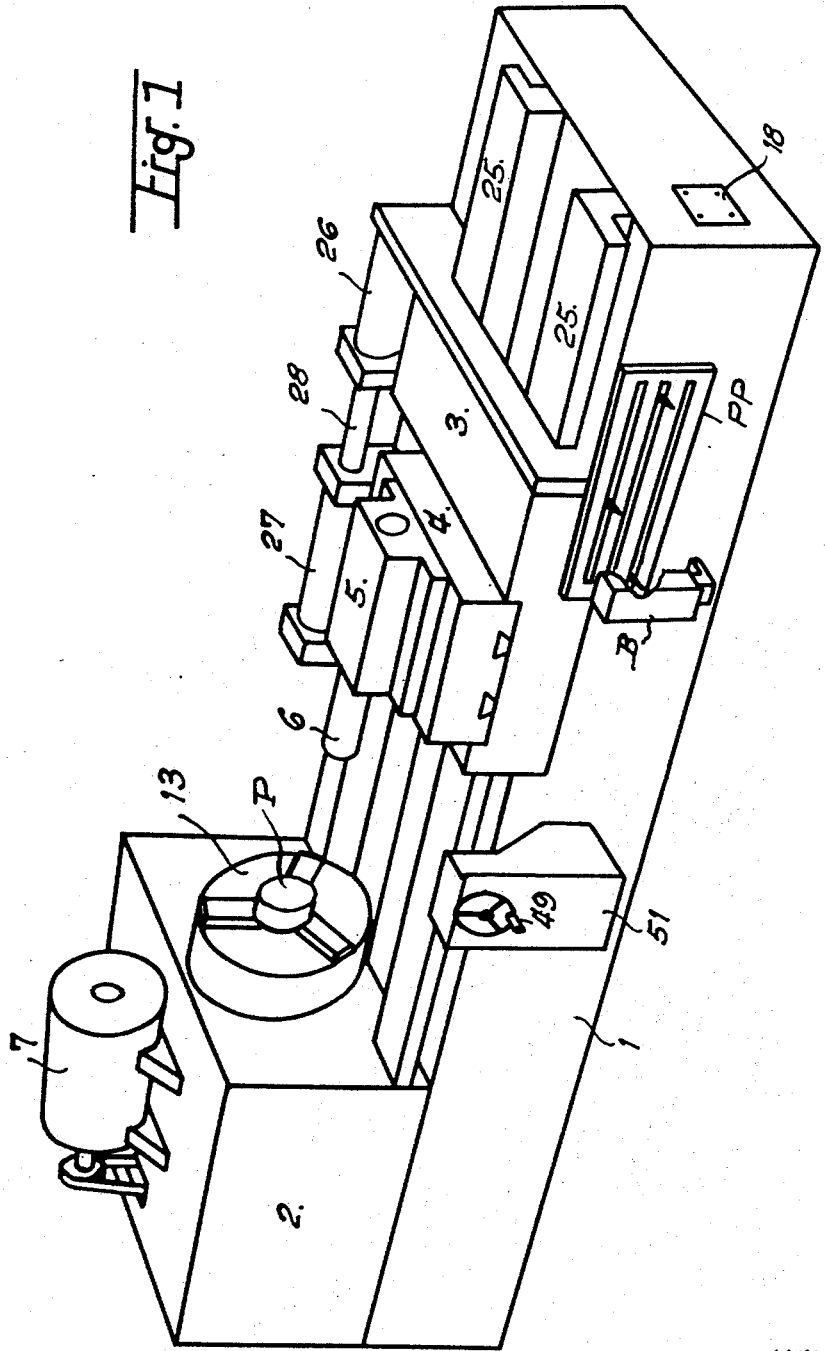
FIG. 1 shows in diagrammatic perspective a semi-automatic thread-cutting lathe in accordance with the invention.
Figure 2:
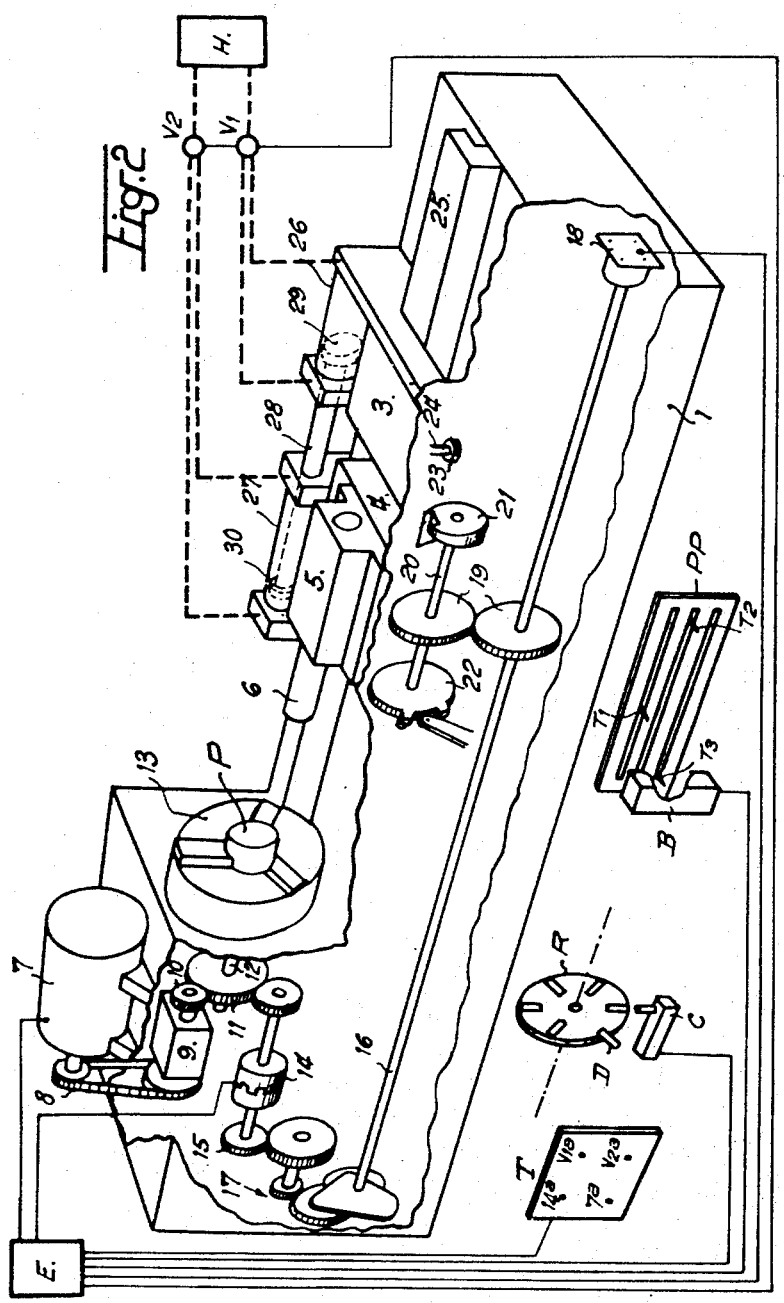
FIG. 2 is a view which is similar to FIG. 1 with portions broken away which serve to show the transmission means between the motor of the machine and the rotating parts.

Referring first to FIGS. 1 and 2, it can be seen that the machine which is illustrated is essentially constituted by a bed 1 on which is mounted a headstock 2 on the one hand and a longitudinal-traversing carriage or slide-rest 3 on the other hand, said slide-rest being in turn adapted to carry a cross-slide 4 on which is mounted the tool-holder 5, said tool-holder being designed to be fitted at 6 with one or a number of cutting tools depending on the type of machining operation to be performed.

The headstock 2 carries a main motor 7 which drives by means of a countershaft 8 a gear-box 9 which in turn drives by means of two pinions 10 and 11 the main spindle 12 fitted with a chuck 13 which carries the part P to be machined in axial alignment therewith.

In the example shown in the drawings, the part referred to is a sleeve to be provided with an internal screw-thread by means of the motion of the tool which is mounted at 6. The pinion 11 drives in its turn a dog-clutch 14 which serves either to disengage or to drive a pinion 15, thereby effecting the drive to a longitudinal shaft 16 by means of a series of gears which are designated by the general reference numeral 17 and which serve to establish in known manner a predetermined ratio between the speed of the spindle 12 and the speed of the shaft 16. Said shaft is fitted at 18 with a brake which can be of the electromagnetic or electrohydraulic control type and which makes it possible in known manner to lock said shaft when the dog-clutch 14 is uncoupled. In addition, by means of a train of pinions 19, the shaft 16 effects the drive to the main camshaft 20 on which are mounted at one end the longitudinal-motion cam 21 and, at the other end, the transverse-motion cam 22.

The longitudinal-motion cam is adapted to cooperate with a roller 23, the shaft 24 of which is rigidly fixed to the slide-rest 3, said slide-rest being carried by two guides 25 which are mounted on the bed 1. In addition, the slide-rest carries a pressure jack 26 which is provided together with a disengagement jack 27 with a common rod 28. It will be noted that, whereas the jack 26 is carried by the slide-rest 3, the jack 27 is carried, on the contrary, by the bed 1 of the machine. It is therefore apparent that, when the piston 29 of the jack 26 is locked, the rod 28 is rigidly coupled with the slide-rest 3 whereas, on the contrary, when the piston 30 of the jack 27 is locked, the rod 28 is rigidly coupled with the bed 1.

FIGS. 2, 4 and 5 also show that the cam 21 has an upwardly sloping ramp 21a in respect of which the roller, in a position such as the positon 23a, moves in the direction of the arrow Fa when the cam itself carries out a movement in the direction of the arrow F. The ramp 21a is followed by a sharply-sloping downward ramp 21b which permits the return of the roller when it reaches a position such as 23b.

Furthermore, in accordance with the invention the cam is provided between the extremity of the downward ramp 21b and the beginning of the upward ramp 21a with a recess 21c of sufficient width to permit the entry of the roller when this latter takes up a position such as 23c.

Figure 3:
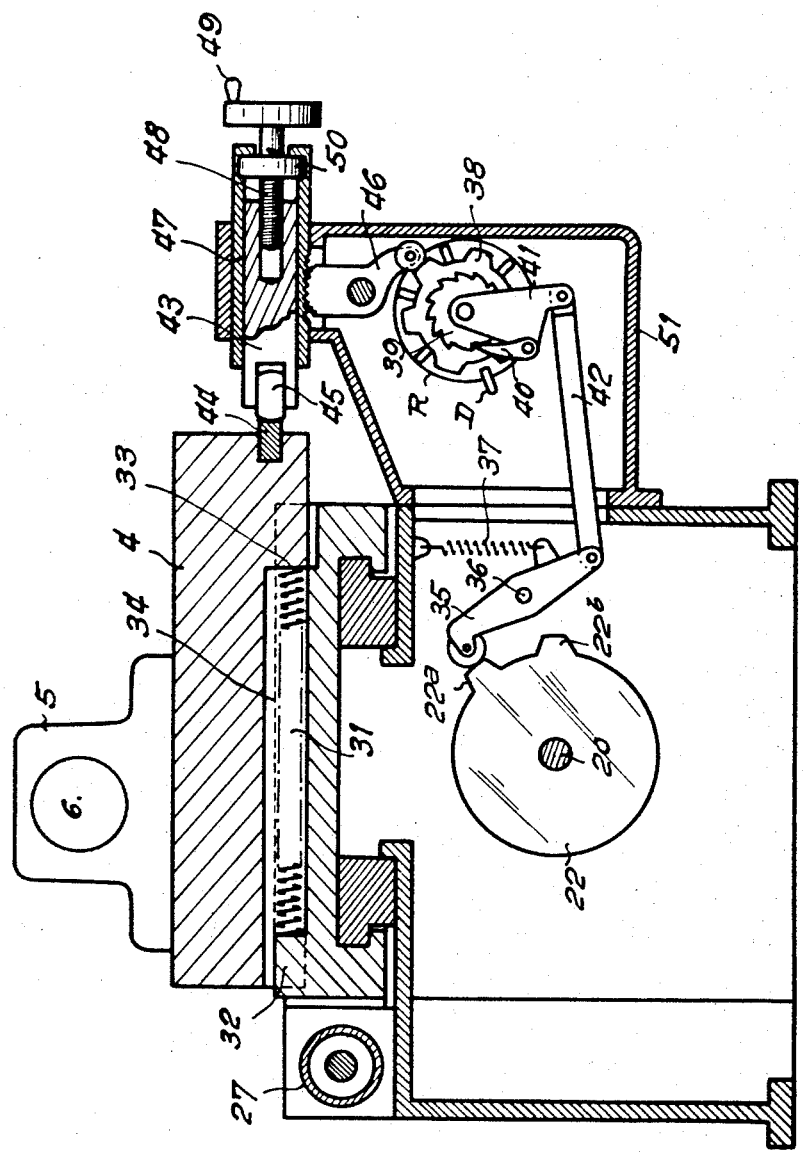
FIG. 3 is a transverse cross-section of the same machine taken in the plane of the transverse-motion cam.

Referring again to FIG. 2 as well as to FIG. 3, it will be observed that the transverse-motion cam 22 produces the transverse movements of the cross-slide 4 by means of a kinematic chain of a type known per se in opposition to a spring 31 which is housed between a shoulder 32 of the slide-rest and a shoulder 33 of the cross-slide, the movements of said cross-slide being guided by slideways 34 of the slide-rest.

It should be noted that the kinematic chain mentioned above essentially comprises a lever 35 which is pivoted at 36 and influenced by two bosses 22a and 22b of the cam in opposition to a restoring spring 37, thus producing for each revolution of the shaft 20 two successive movements of the cam 38 by virtue of a ratchet wheel 39 which is driven by a pawl 40 carried by the lever 41 which is coupled to the lever 35 by means of a connecting-arm 42.

The cam 38 is a boss-type cam in which the different raised portions and hollowed portions determine the successive tranverse positions of the cross-slide in respect of a given machining operation by pushing back in opposition to the spring 31 the slide block 43 which actuates the rule 44 of the cross-slide by means of a runner-wheel 45. It will be noted that the cam 38 produces action on the slide block 43 through the intermediary of a toothed lever 46 which cooperates with the rack teeth of a sleeve 47. The position of the slide block with respect to the sleeve is also adjustable by hand with a view to effecting certain preliminary adjustments by means of a screw 48 which is operable by hand at 49, said screw being engaged with an internal screw-thread of the slide-block and locked at 50 with respect to the sleeve 47.

The kinematic chain which is thus shown in the drawings is partly housed in a casing 51 which can be seen in FIG. 1 together with the manual adjustment handwheel 49.

The machine described herein is completed by ancillary means for the control and automation of the cycles, the main elements of which have been illustrated diagrammatically in FIG. 2.

In this figure, there is shown first a hydraulic unit H with pump and supply tank which feeds the two jacks 26 and 27 through four pipes controlled by two electrovalves V1 and V2.

In addition, the slide-rest 3 carries a programming panel PP in which are formed slits for receiving positionally adjustable stops T1, T2, T3 which actuate the microswitches of a unit B which is rigidly fixed to the bed 1. The first stop T1 produces action at the end of the engagement travel, the second stop T2 produces action at the end of the boring travel or traversing movement, and the stop T3 produces action at the end of the disengagement travel of the slide-rest.

Provision is made for a wheel R which is keyed on the shaft of cam 38 and provided with a number of removable stops D corresponding to the number of raised portions or bosses of the cam. The stop which is placed in the "raised" position is capable of actuating a micro-switch C on completion of a thread-cutting cycle.

Finally, an electric control unit E is connected to the motor 7, to the dog-clutch 14, to the brake 18 and to the electrovalves V1 and V2 so as to control these latter. Said control unit is in turn operated in dependence on a control panel T which is provided among other elements with push-buttons 7a, 14a, V1a and V2a for the units 7, 14, V1 and V2.

The machine which has just been described operates as follows for the purpose of carrying out, for example, a boring operation followed by an internal thread-cutting operation inside a sleeve P. The slide-rest 3 being located in the disengaged position, the sleeve P to be machined having been clamped in the chuck 13 and a boring tool put into service at 6, the operator starts up the main motor 7 of the machine by pressing the appropriate button 7a of the control panel T. At the same time, the operator presses a second control button V2a which opens the electrovalve V2, with the result that the oil pressure is supplied to the jack 27 in the direction which produces the feed motion of the slide-rest 3 towards the headstock 2. When said jack has completed its full travel, the movement of engagement of the slide-rest is completed, the roller 23 having passed through the recess 21c, the end-of-travel stop T1 which is coupled to the slide-rest actuates one of the micro-switches of unit B which in turn energizes the electrovalve V1. Said electrovalve directs the pressure towards the jack 26, which corresponds to a slow feed motion of the slide-rest towards the headstock. The suitable tool thus carries out the boring operation. When this operation is completed, another stop T2 actuates another micro-switch of unit B in order to initiate the reversal of the electrovalve V1 and therefore the movement of the jack 26 which returns to its starting point.

When the boring operation is completed, the machine operator replaces the boring tool by a thread-cutting tool, for example by rotating the tool-holder bar and engages the dog-clutch 14 by means of the control button 14a of the panel T. The speed ratios having been suitably determined by the choice of the transmission system 17, there accordingly takes place a synchronous rotation of the spindle 12 and camshaft 20. The transverse-motion cam 22 produces the transverse movements of the cross-slide in known manner, namely a movement of engagement and disengagement of the tool, depending on whether the cam 38 produces action by means of one of its bosses or one of its recesses, as well as a movement of slow penetration of the tool progressively as the bosses of the cam 38 are higher.

At the same time, the helical ramp 21a of the cam 21 actuates the roller 23 and pushes this latter in a longitudinal direction, thus driving the slide-rest which produces the thread pitch, this movement being carried out in opposition to the action of the jack 26, the electrovalve V1 of which has remained open and to which the pressure is therefore still applied in the return direction.

When the roller 23 reaches the uppermost point of the ramp 21a, said roller leaves this latter and the slide-rest 3 returns to its starting point under the action of the jack 26 which reaches the end of its travel and accordingly prevents the roller 23 from passing through the recess 21c. As the camshaft continues to rotate, the roller 23 is again engaged with the initial portion of the helical ramp without being permitted to pass through the recess 21c and so on in sequence, the longitudinal motion of the slide-rest 3 being carried out in synchronism with the transverse motion of the cross-slide for the purpose of performing the complete thread-cutting operation.

When the predetermined number of passes has been made, the dog-clutch 14 is accordingly disconnected by virtue of the wheel R, the removable stop D of which has previously been set in the "raised" position, thus actuating the micro-switch C which in turn transmits the control action to the unit E.

At the same time, the unit E operates the brake 18 which immobilizes the entire section of the transmission system which is located beyond the dog-clutch 14 and in particular the longitudinal-motion cam 21, with the result that the roller 23 is located in position 23c of FIG. 5 (end of a thread-cutting pass).

Finally, the unit E produces action on the electrovalve V2 so as to reverse the pressure within the jack 27 and on the electrovalve V1 so as to lock the jack 26.

As a consequence, the jack 26 now constitutes the fixed point of the rod 28, whereupon the jack 27 pushes back the slide-rest 3 so as to effect the movement of disengagement and so as to cause the roller 23 to pass at the same time through the recess 21c. The end-of-travel stop T3 then produces action on the unit B and stops the main motor. Finally, the initial position is therefore again reached, the boring and thread-cutting operations have been completed and the part 14 can be removed.

It will in any case be understood that the embodiment of the invention which has just been described has been given solely by way of non-limitative example and that any or all detail modifications can be contemplated without thereby departing either from the scope or the spirit of the invention.

What is claimed is:

1. A thread-cutting machine, especially a semi-automatic thread-cutting lathe of the type comprising at least one headstock with rotary spindle and chuck for clamping the part to be machined, a bed, a slide-rest which is adapted to move lengthwise along the bed by means of a roller working in conjunction with a longitudinal-motion rotary cam in opposition to a pressure means, a cross-slide which is adapted to move transversely on the slide-rest under the action of a transverse-motion control unit, a tool-holder mounted on the cross-slide and means for driving the rotary spindle, the longitudinal-motion rotary cam and the transverse-motion control unit, said machine being characterized in that the longitudinal-motion cam or at least one of its longitudinal-motion cams is provided with a recess which permits the entry of the roller with which said cam cooperates, means being provided for preventing said entry during thread-cutting operations.

2. A machine in accordance with claim 1, characterized in that the recess is placed between the extremity of the rapid-return section and the beginning of the slow-feed section of the longitudinal-motion cam.

3. A machine in accordance with claim 1 characterized in that the expedient employed for preventing the roller from passing through the recess consists in locking the pressure means when the roller is located opposite to the recess.

4. A machine in accordance with claim 3, characterized in that, when the pressure means is a fluid-type jack, said jack is locked by means of a control system which isolates the jack.

5. A machine in accordance with claim 3, characterized in that, when the pressure means is a fluid-type jack, the jack is locked by virtue of the fact that said jack is so dimensioned as to be located at its end of travel when the roller is located in the lowermost portion of the upwardly sloping ramp of the cam.

6. A machine in accordance with claim 1, characterized in that said machine is equipped with a means for the disengagement and return of the slide-rest which can be put into operation after completion of a thread-cutting operation.

7. A machine in accordance with claim 6, characterized in that the means for producing the disengagement and return motion is a double-acting fluid-type jack which is coupled on the one hand to the bed and on the other hand to the slide-rest, said jack being supplied with fluid at the requisite moment so as to initiate either the disengagement or the return motion of the slide-rest.

8. A machine in accordance with claim 7, characterized in that, when the pressure means is a jack, the disengagement jack and the pressure jack are mounted in alignment, the disengagement jack being mounted on the bed and the pressure jack being mounted on the slide-rest, said jacks being disposed opposite to each other with a common piston rod.

9. A machine in accordance with claim 8, characterized in that the pressure jack and the disengagement jack are combined into a single jack.

References Cited

UNITED STATES PATENTS

| | | | |
|---|---|---|---|
| 2,797,601 | 7/1957 | Renoux | 82—5 |
| 2,926,366 | 3/1960 | Mannaioni | 82—5 X |
| 3,026,549 | 3/1962 | Hartshorn | 82—5 X |
| 3,090,267 | 5/1963 | Trumpp | 82—5 |
| 3,102,445 | 9/1963 | Elledge | 82—5 |
| 3,199,385 | 8/1965 | Bechler | 82—5 |
| 3,209,628 | 10/1965 | Brown et al. | 82—5 |
| 3,285,108 | 11/1966 | Thevenet | 82—5 |

HARRISON L. HINSON, *Primary Examiner.*